US007023987B1

(12) United States Patent
Prentice

(10) Patent No.: US 7,023,987 B1
(45) Date of Patent: Apr. 4, 2006

(54) METHOD AND APPARATUS FOR ADAPTING A PHONE FOR USE IN NETWORK VOICE OPERATIONS

(75) Inventor: Edward J. Prentice, Palo Alto, CA (US)

(73) Assignee: Televoce, Inc., Palo Alto, CA (US)

( * ) Notice: Subject to any disclaimer, the term of this patent is extended or adjusted under 35 U.S.C. 154(b) by 0 days.

(21) Appl. No.: 09/565,571

(22) Filed: May 4, 2000

(51) Int. Cl.
H04M 1/253 (2006.01)
(52) U.S. Cl. .............. 379/413.03; 379/361; 379/93.05; 379/900
(58) Field of Classification Search ............. 379/93.01, 379/93.05, 93.06, 93.07, 93.09, 100.12, 100.15, 379/418, 413.03, 900, 361
See application file for complete search history.

(56) References Cited

U.S. PATENT DOCUMENTS

| 5,526,408 | A | * | 6/1996 | Yekutiely | 379/93.26 |
| 5,768,351 | A | | 6/1998 | England | 379/93.37 |
| 5,822,406 | A | * | 10/1998 | Brown | 379/100.09 |
| 5,974,043 | A | * | 10/1999 | Solomon | 370/352 |
| 6,003,073 | A | * | 12/1999 | Solvason | 709/219 |
| 6,233,633 | B1 | * | 5/2001 | Douma | 710/69 |
| 6,456,715 | B1 | * | 9/2002 | Kennedy | 379/442 |
| 6,700,956 | B1 | * | 3/2004 | Chang et al. | 379/93.05 |
| 2001/0040960 | A1 | * | 11/2001 | Hamami et al. | 379/352 |

FOREIGN PATENT DOCUMENTS

| EP | 0 666 680 | 8/1995 |
| WO | WO 98/18238 | 4/1998 |
| WO | WO98/18238 | * 4/1998 |

OTHER PUBLICATIONS

"Solram Electronics Announces the Release of the Interhome Internet Telephony Adapter During Internet World 97/ISrael," Solram Electronics Ltd., Press Release, Jun. 16, 1997, 3 pages.
"Voice and Fax Over the Internet," Solram Electronics Ltd., White Paper, 9 pages.

(Continued)

Primary Examiner—Daniel Swerdlow
(74) Attorney, Agent, or Firm—Pillsbury Winthrop et al.

(57) ABSTRACT

An interface is provided between a conventional telephone and a conventional computer configured for network voice applications including a sound card and modem. The interface allows for use of the telephone during network voice applications such as IP telephony and voice chat. When the telephone is not used, the interface allows for sound to be input and output via the computer sound card and conventional computer microphone and speakers. When the telephone is picked up off-hook, the interface senses the off-hook state, causes the computer sound card to be connected to the telephone instead of the conventional microphone and speakers, and allows for network voice applications to be conducted using the telephone. Various alternative embodiments of the invention allow for signaling of the telephone hook state to software resident on the PC for controlling network voice applications, for sensing DTMF signals in accordance with keypad entries on the telephone to control initiation of phone calls and voice chat sessions, for generating dial tones and busy signals, or other sounds and/or voice messages, in accordance with the telephone hook state and the telephone line status, and for permitting the telephone to be controllably connected to the PSTN for making standard PSTN calls in addition to calls involving network voice applications.

22 Claims, 13 Drawing Sheets

OTHER PUBLICATIONS

Internet Telephone Adaptor Parts List, Jech Tech, Inc.:, 3 pages.

Gleeman, Robert J.; "An Advanced Internet Telephone Interface," description of sound card use, VMB/60, 1 page.

VMB/60 Voice Message Bank, "Break the Voice Mail Barrier," A & B Design, 4 pages.

Jech Tech, Inc., iPatcher Internet Telephone Adapter feature list, http://www.jechtech.com/ipatcher.htm, 4 pages.

Information Highway Inc. Internet Advertisement, http://www.columbia-tel.com, Jun., 1997, 4 pages.

Go2Call.com, Internet Advertisement for FoneNet Connect, http://www.go2call.com/FNCover-view.asp; 2 pages.

* cited by examiner

METHOD AND APPARATUS FOR ADAPTING A PHONE FOR USE IN NETWORK VOICE OPERATIONS

BACKGROUND OF THE INVENTION

1. Field of the Invention

The present invention relates to network voice applications such as IP telephony and voice chat, and more particularly, to a method and apparatus for adapting a conventional computer and telephone for convenient and simple access to network voice applications.

2. Description of the Related Art

Conventional Internet telephony, sometimes called Voice over IP (VoIP), has proliferated rapidly in recent years. Other network voice applications, such as Internet voice chat, have also found rapid acceptance by consumers and businesses alike.

Conventionally, Internet telephony requires a consumer to subscribe to an Internet telephony service and to place calls using special software and a computer having a modem, and a sound card with speaker outputs and microphone inputs. The called person must have a similar setup and subscription. Some IP telephony services allow subscribers to place calls to and from standard telephones, but these services must have investments in telecommunications infrastructures such as IP voice gateways for converting and switching IP voice calls between the public switched telephone network (PSTN) and the Internet.

Voice chat applications typically do not require a subscription, but can typically be accessed through conventional ISPs and sites such as Yahoo. Specialized software must be configured on the user's computer for encoding and decoding between packetized voice sent over the Internet and sound inputs and outputs via the user's microphone and speakers and computer sound card.

Although technological advances have done much to make network voice applications such as IP telephony and voice chat available to the average consumer, many drawbacks and disadvantages remain.

For example, using a computer microphone and speakers for network voice applications can be inconvenient, results in loss of privacy, ties the user to the computer. More importantly, acoustic coupling between the microphone and speakers is a significant problem, requiring the user to constantly adjust the gain and positioning of the microphones and speakers to prevent feedback and echo. Alternatively, the user may be forced to purchase a headset adapted for use with computer voice applications to reduce the acoustic coupling problem. Meanwhile, conventional telephones are ubiquitous, cheap and do not suffer from acoustic coupling, and consumers are accustomed to using a telephone for personal voice calls.

Accordingly, there remains a need in the art for a more convenient way to conduct network voice applications using a conventional computer. The present invention fulfills this need, among others.

SUMMARY OF THE INVENTION

Accordingly, an object of the present invention is to overcome the above-described limitations and problems of the prior art.

Another object of the invention is to reduce the difficulty of conducting network voice applications such as IP telephony or voice chat through a conventional personal computer.

Another object of the invention is to reduce acoustic coupling between a microphone and speaker during network voice applications using a conventional personal computer.

Another object of the invention is to allow for simple connection of a conventional telephone for use in network voice applications such as IP telephony or voice chat.

Another object of the invention is to expand the functionality of network voice applications without substantially increasing their cost.

Another object of the invention is to allow a conventional telephone to be used both for network voice applications and for standard PSTN calls without requiring any changes to the telephone.

To achieve these objects and others, the present invention provides an interface between a conventional telephone and a conventional computer configured for network voice applications including a sound card and modem. The interface allows for use of the telephone during network voice applications such as IP telephony and voice chat. When the telephone is not used, the interface allows for sound to be input and output via the computer sound card and conventional computer microphone and speakers. When the telephone is picked up off-hook, the interface senses the off-hook state, causes the computer sound card to be connected to the telephone instead of the conventional microphone and speakers, and allows for network voice applications to be conducted using the telephone. Various alternative embodiments of the invention allow for signaling of the telephone hook state to software resident on the PC for controlling network voice applications, for sensing DTMF signals in accordance with keypad entries on the telephone to control initiation of phone calls and voice chat sessions, for generating dial tones, busy signals and voice messages in accordance with the telephone hook state and the telephone line status, and for permitting the telephone to be controllably connected to the PSTN for making standard PSTN calls in addition to calls involving network voice applications.

BRIEF DESCRIPTION OF THE DRAWINGS

These and other objects and advantages of the present invention, along with the best mode for practicing it, will become apparent to those skilled in the art after considering the following detailed specification, together with the accompanying drawings wherein.

DETAILED DESCRIPTION OF THE INVENTION

Figure 1:
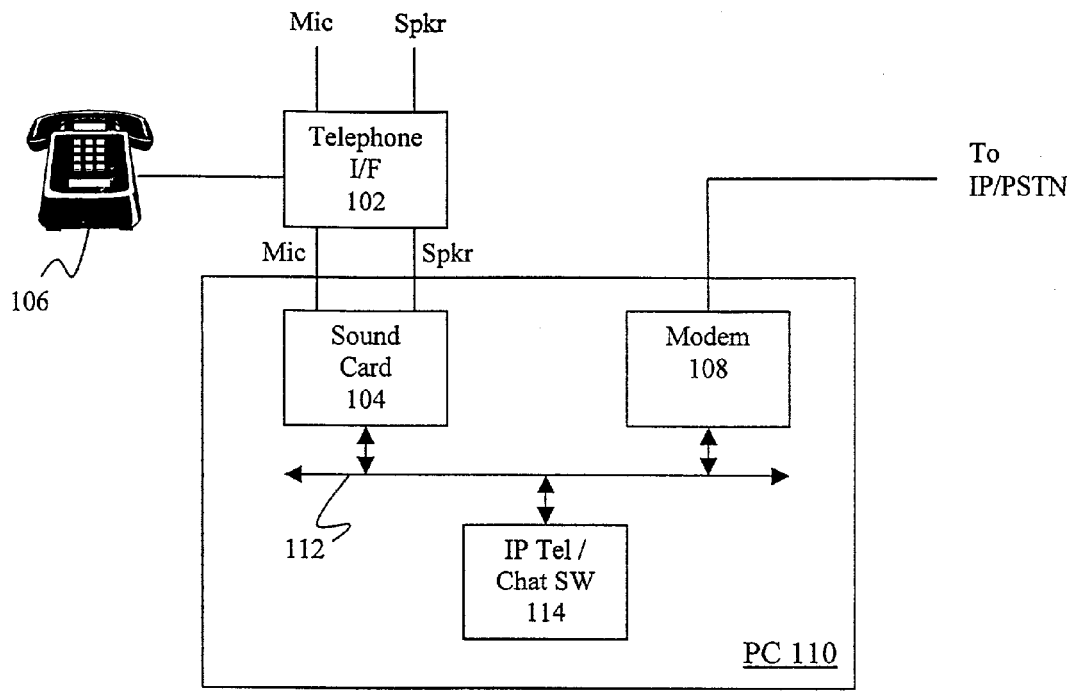
FIG. 1 illustrates a first exemplary implementation of the present invention.

FIG. 1 illustrates a first exemplary implementation of the present invention.

As shown in FIG. 1, the invention includes a telephone interface 102 that connects to the microphone and speaker jacks of a conventional computer sound card 104, as well as to a conventional telephone 106. Telephone interface 102 may further include the ability to connect to conventional speakers and microphone, which ability is not necessary but yields certain advantages and is therefore preferred.

When used in the conventional manner for network voice operations, the gain on the microphones and speakers may need to be adjusted to prevent feedback and echo. However, when the phone is used instead as enabled by the present invention, this problem is solved.

In this example, sound card 104 and conventional modem 108 are provided in a conventional PC 110, which further includes executable conventional IP telephony/chat software 114 that communicates with sound card 104 and modem 108 via PC bus 112.

Although the invention will be discussed in detail hereinbelow with reference to an example where the telephone connection is a standard PSTN connection in which the PC communicates with the Internet using IP through a dial-up connection to an ISP, the invention is not so limited. Rather, the principles of the invention can be extended to other applications, protocols and environments, including cable modems, DSL lines, ISDN networks, corporate intranets, LANs and WANs, Ethernet applications, etc. Those skilled in the art will understand how to extend the invention to such other applications and environments after being taught by the present specification.

PC 110 is a conventional personal computer such as an IBM-compatible PC or an Apple computer such as a Mac or iMac. It should become apparent that the principles of the invention can be extended to many types of personal computers including desktops, laptops, thin clients, and even handheld computers, set-top boxes and Internet appliances. Accordingly, PC 110 should not be construed as limited to conventional personal computers.

IP telephony/chat software 114 is any type of conventional IP telephony or voice chat software that can be provided by any of a number of commercial sources such as Net2Phone, DialPad, HearMe and FireTalk. Preferably, however, such network voice applications are able to communicate with, and be launched or shut down by other software applications under a common operating system using API's and OS calls and the like.

Sound card 104 is any Windows-compatible (if PC 110 is an IBM-compatible PC) conventional sound card having standard microphone and speaker outputs. Preferably, sound card 104 is included with drivers that allow for manipulation of input and output audio streams from and to the sound card using OS calls and the like. Conventional sound cards contain many components that are not necessary for the present invention, and thus the invention is not limited to sound cards. However, most sound cards have a codec and a PC bus interface that converts between data streams (used by network voice applications, i.e. a data channel) and sound signals (used by the microphone and speakers), which functionalities are necessary for the present invention, and which functionalities are well understood by those of skill in the art. It should be noted, however, that such functionalities can be implemented in many alternative ways other than sound cards, and so the sound card example is given by way of illustration and for ease of understanding the invention.

Modem 108 is a conventional Windows-compatible (if PC 110 is an IBM-compatible PC) modem that is capable of being used in network voice applications such as IP telephony and voice chat. It should be apparent that either an internal or external modem may be adapted for use with the present invention. Preferably, modem 108 is included with drivers that allow for transmission and reception of data packets and control of connections using OS calls and the like. It should be noted that although conventional analog (e.g. 56 kbps) modems are (at present) the most common type of modem used with a PC, the invention is extendable to applications other than PCs and analog modems, including cable modems, DSL modems, Ethernet connections, etc.

PC bus 112 is a conventional internal bus such as an ISA or PCI bus that allows for communications between components in PC 110.

It should be apparent that PC 110 may include many other components that are not illustrated in FIG. 1, such as a CPU, memory and other storage devices. Moreover, IP telephony/chat software 114 execute routines that cause data to be communicated with sound card 104 and modem 108 via device drivers and a conventional PC operating system, as is well understood in the art. However, the details of such additional components are not presented here so as not to obscure the present invention.

Moreover, although shown separately for clarity of the invention, telephone interface 102 need not be physically isolated from either telephone 106 or sound card 104. Rather, the componentry of telephone interface 102, as well as the componentry of sound card 104 and telephone 106 that is necessary for the invention, may be entirely incorporated into either or both of telephone 106 and sound card 104. It is even possible that all the componentry and functionality of PC 110, telephone interface 102, sound card 104, modem 108 and IP telephony/chat software 114 may be incorporated in a single device. The actual division and collection of components within or without PC 110, telephone 106 and sound card 104 is thus incidental to the present invention, and those of skill in the art will understand alternative implementations after being taught by the present specification.

Figure 2:
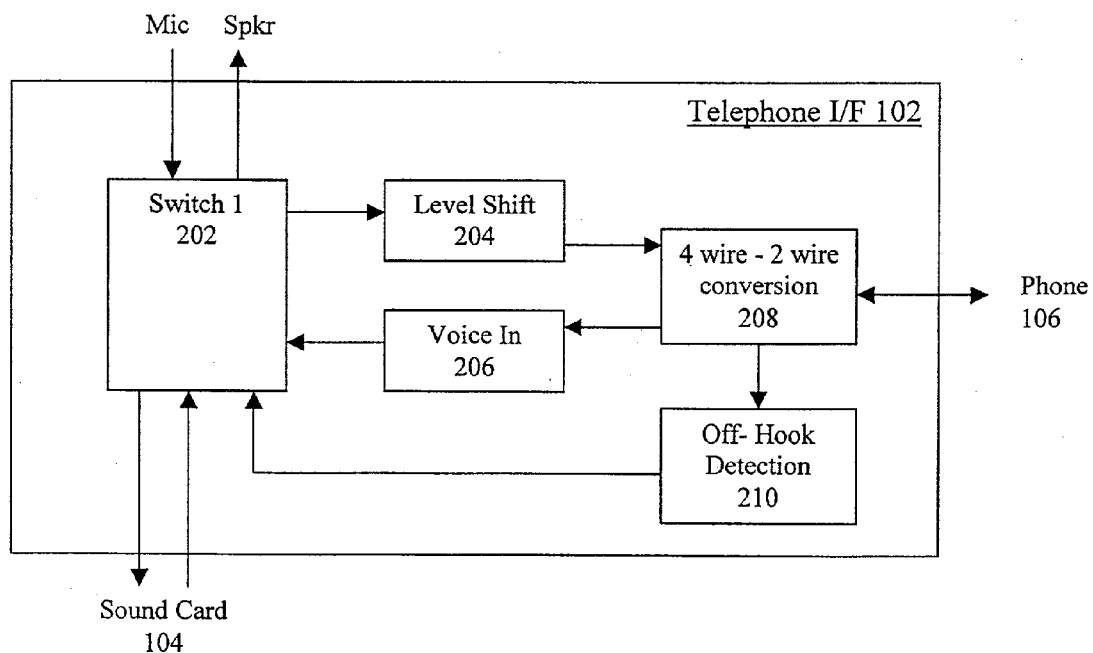
FIG. 2 illustrates a telephone interface in accordance with the first example of the invention illustrated in FIG. 1.

FIG. 2 illustrates a telephone interface 102 in this example of the invention in even more detail.

As shown in FIG. 2, telephone interface 102 includes a first switch 202, a level shifter 204, a voice input 206, a 4-wire /2-wire converter 208, and an off-hook detector 210.

First switch 202 is used to control the connection between the sound card and either the telephone 106 or the conventional microphone and speakers via the microphone/speaker I/O jacks of the sound card. In this example of the invention, switch 202 is controlled by the output of the off-hook detector 210, as will be discussed below.

Level shifter 204 provides 24V DC to drive the telephone and to level shift the sound output signals from the sound card to the +/−12V levels of the DC drive. This is because the output of the sound card is in the form of signals having a range of 0-5 V DC, while the signals needed for the telephone are offset by negative 24V DC. Accordingly, level shifter 204 includes circuitry that converts the signals received from the sound card into the signals needed by the telephone.

Voice input 206 receives the voice input from the telephone and converts it into signals to be generated for the sound card. This is because the output of the telephone is offset by negative 24 V DC while the signals needed for the sound card are 0–5 V DC. Accordingly, voice input 206 includes circuitry that converts the signals received from the telephone into the signals needed by the sound card.

The 4-wire /2-wire converter 208 receives the two-wire inputs from the telephone 106 and provides two-wire outputs to the telephone, while receiving four-wire inputs from the sound card 104 via switch 202 and providing four-wire 110 outputs to the sound card 104 via switch 202, when switch 202 is set to allow the sound card 104 and telephone 106 to communicate with each other.

DC current drawn by the telephone is sensed by, for example, measuring the voltage drop across a resistor in off-hook detector 210, so as to detect when the handset is lifted off the telephone. In this example of the invention, when off-hook condition is detected, off-hook detector 210 signals first switch 202 by a control signal. Off-hook detector 210 can further provide a control signal when the phone is not off-hook. For example, the control signal can have the value of the voltage across the resistor in accordance with the hook state. That is, when no current is drawn (i.e., the phone is on hook), the control signal has a value of 0 V. When current is drawn by the phone (i.e. the phone is off hook), a voltage of 5 V appears across the resistor, and the control signal achieves this value.

It should be apparent that, many alternatives other than that presented above can be implemented to signal the off-hook/on-hook state of telephone 106. For example, rather than having off-hook detector 210 provide two states of the same control signal (e.g. a digital "high" or "low" value of a signal), two different control signals (e.g. one signal for on-hook, one signal for off-hook), or identical pulses on the same control signal (e.g. send a pulse when a change of state occurs) can be implemented.

In this example of the invention illustrated in FIGS. 1 and 2, telephone 106 is a standalone phone that is not connected to the PSTN. When a PC user wishes to use the telephone 106 for IP telephony and voice chat operations, the PC user uses the IP telephony/voice chat software 114 in the conventional way to place the desired call and/or enter the desired voice chat room. At that point, the user's voice will be captured by the conventional PC microphone, and the other participants' voices will be played on the conventional PC or external speakers by sound card 104 in the conventional way. When, however, the PC user picks up the handset of telephone 106, off-hook detector 210 senses the off-hook state of the telephone 106 and sends a signal to first switch 202, causing the switch to direct further voice input and output through the telephone rather than through the conventional microphone and speakers.

It should be noted that telephone 106 is thus any conventional telephone that conforms to industry standards for passively signaling an off-hook state via, typically, a low-impedance between the conventional two-wire input/outputs. Thus, telephone 106 can include cordless telephones in addition to all types of corded telephones. Moreover, it should be apparent that an "off-hook" state is capable of occurring in some conventional phones in ways other than physical lifting of a handset from a cradle, but can include activating a "talk" switch on a cordless phone or speaker phone, for example.

Figure 3:
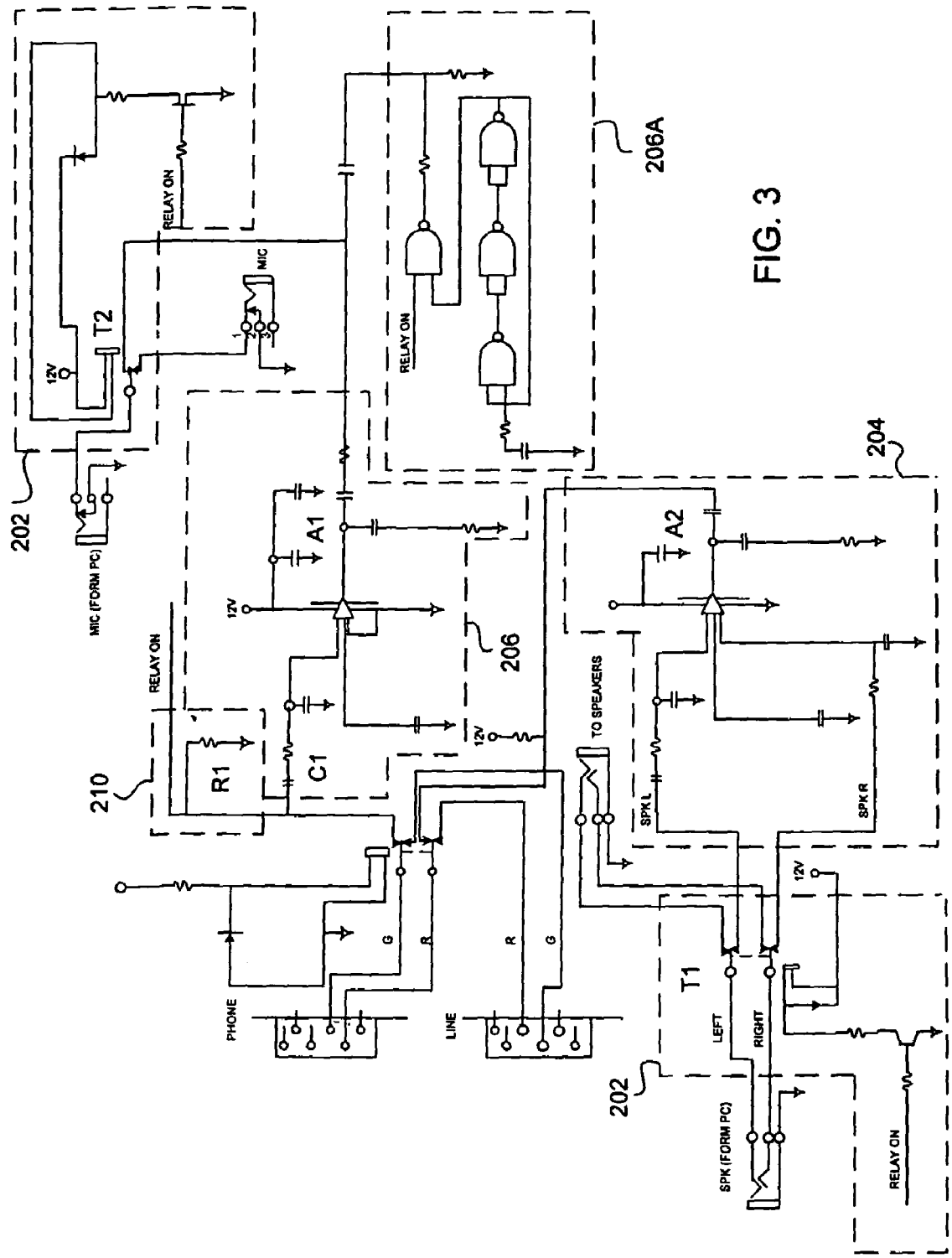
FIG. 3 is a schematic diagram further illustrating an example of the telephone interface.

FIG. 3 illustrates an example implementation of telephone interface 102 using discrete components.

As shown in FIG. 3, switch 202 consists of a pair of relays T1 and T2 that are activated in accordance with a "RELAY_ON" signal. The "RELAY_ON" signal is provided by hook detector 210, which as shown in FIG. 3, is merely the voltage across a resistor R1 connected to the phone. Voice input 206 essentially comprises a capacitor C1 and amplifier A1, and level shifter 204 essentially comprises amplifier A2. As shown in FIG. 3, 4 wire-2 wire converter 208 essentially comprises the interconnections between the phone connector and level shifter 204 and voice input 206. FIG. 3 also shows a tone generator that is used to implement voice input 206-A as will be described in more detail in conjunction with another example of the invention below.

Figure 4:
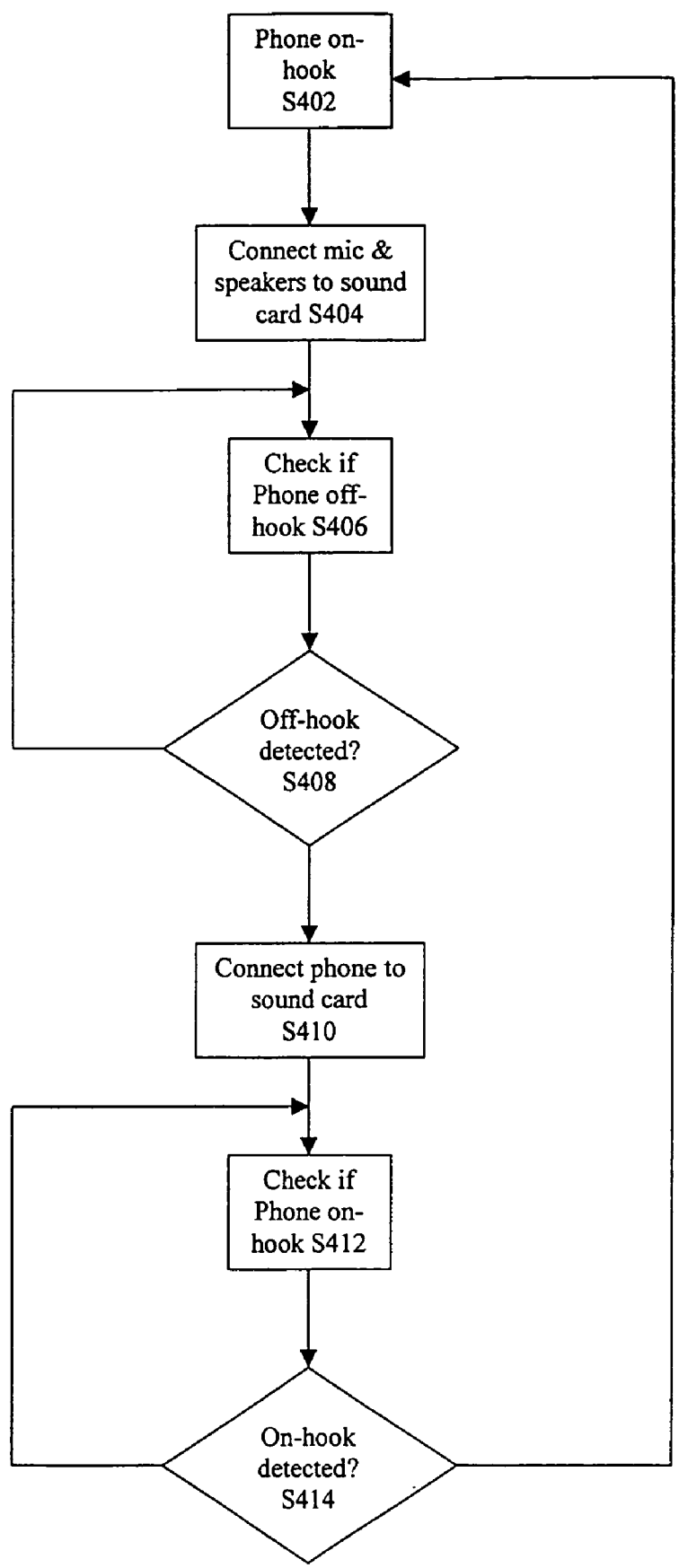
FIG. 4 is a flowchart illustrating a method implemented by the telephone interface in accordance with the first example of the invention.

FIG. 4 is a flowchart illustrating the operation of telephone interface 102 in accordance with this example of the invention.

As shown in FIG. 4, in an initial step S402, the phone is initially on-hook. Accordingly, in step S404, the conventional microphone and speakers are connected to the respective jacks on sound card 104 via first switch 202. Hook detector 210 checks to see if the phone handset has been lifted off hook by, for example, measuring the current drawn across the two phone wires (step S406). If the phone is now off-hook (determined in step S408), hook detector 210 sends a signal to first switch 202 which causes the phone to be connected to sound card 104 (step S410). Hook detector 210 then checks to see if the phone handset has been placed back on-hook by, for example measuring the current flow as before (step S412). If the phone is now back on-hook (determined in step S414), telephone interface returns to the on-hook state in step S402.

Figure 5:
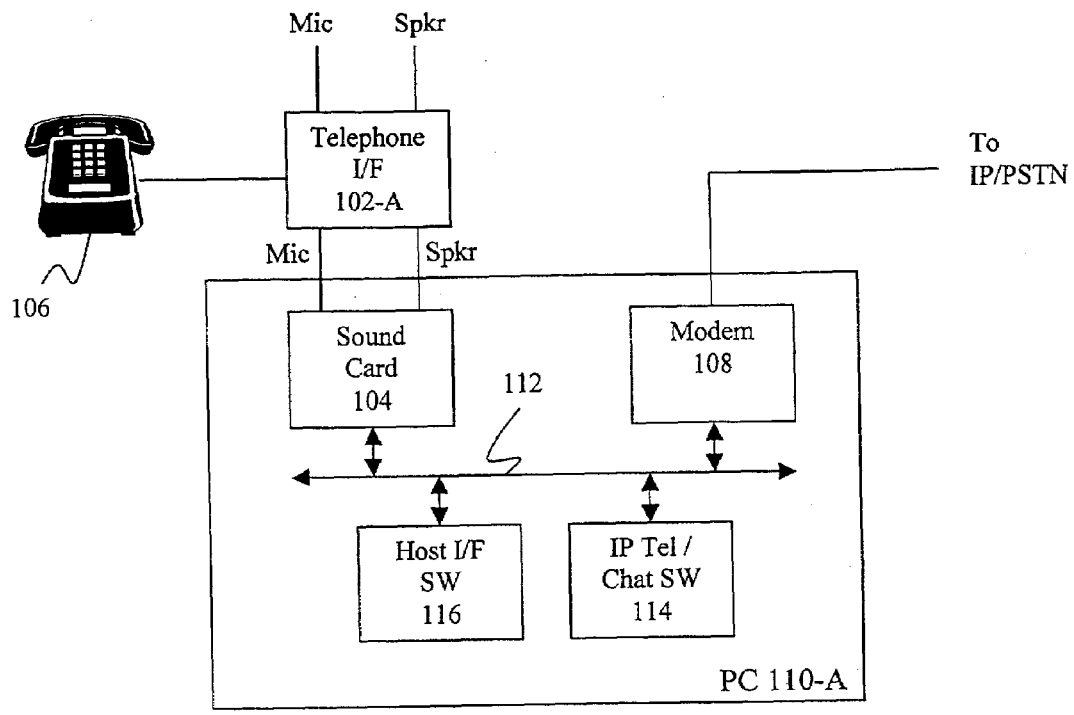
FIG. 5 illustrates a second exemplary implementation of the present invention.

FIG. 5 illustrates a second exemplary implementation of the present invention. As shown in FIG. 5, another example of telephone interface 102-A is provided. Moreover, PC 110-A according to this example of the invention further includes host interface software 116.

In this example of the invention, telephone interface 102-A includes additional functionality for signaling the off-hook state of telephone 106 to host interface software 116. This signaling can be used by host interface software 116, for example, to launch an internet telephone call or voice chat application via IP telephone/chat software 114. Host interface software 116 can also include functionality for generating a dial tone and capturing numbers entered by pressing keys on the keypad of phone 106, which functionality can be used to select what type of network voice operation to launch, number to dial, chat room to enter, etc.

Figure 6:
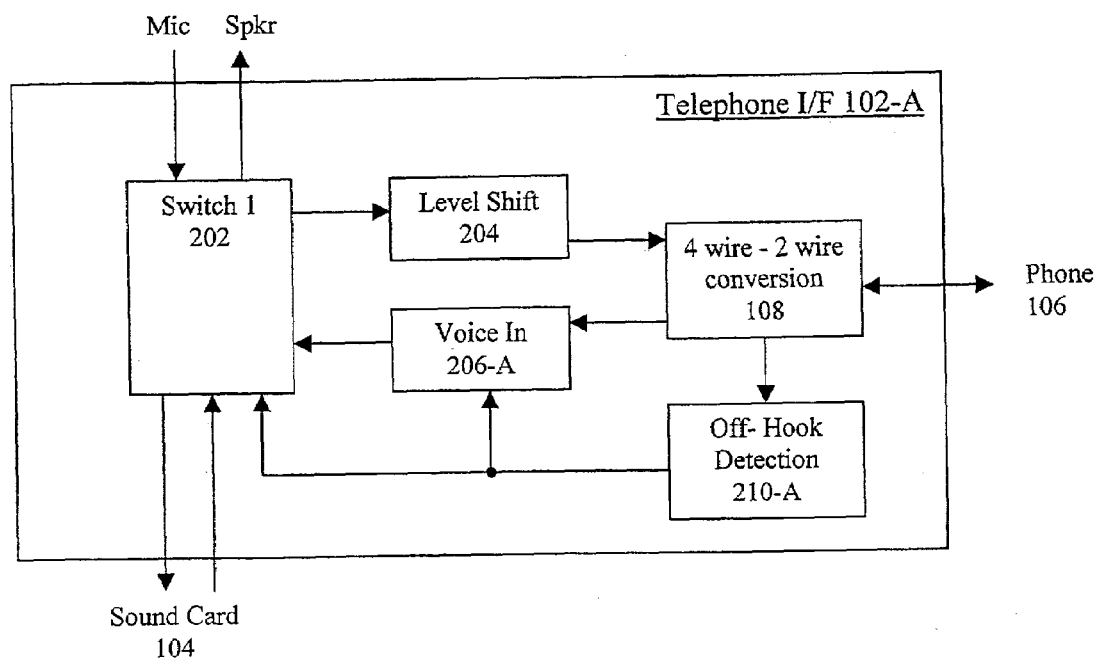
FIG. 6 illustrates a telephone interface in accordance with the second example of the invention illustrated in FIG. 5.

FIG. 6 illustrates a telephone interface 102-A in this example of the invention in even more detail. As shown in FIG. 6, telephone interface 102-A includes an alternative voice input 206-A and an alternative off-hook detector 210-A. In general, these alternative components provide the additional functionality of providing a signal to host interface software 116 in accordance with the off-hook state of telephone 106.

Off-hook detector 210-A further provides an off-hook signal to voice input 206-A in addition to first switch 202. The method used by off-hook detector 210-A to signal hook state to voice input 206-A can be the same as that used to signal hook state to first switch 202. However, care may need to be taken so that the signals are received by first switch 202 and voice input 206-A in the correct order, as will become more apparent below.

Voice input 206-A further includes functionality for generating a tone depending on the hook state signal received from hook detector 210-A. For example, when hook detector 210-A signals that the phone has been lifted off the hook, voice input 206-A can continue to generate a tone, and when hook detector 210-A signals that the phone has been placed back on-hook, voice input 206-A can stop generating the tone. This tone will be sent to sound card 104 via switch 202 (which must be in the proper switch orientation as per the state signaled by hook detector 210-A).

Preferably, the generated tone has a frequency that is out of the voice band (e.g. 4 kHz), so as to be easily detected by host interface software 116 and so as not to interfere with the voice signals communicated between the sound card and the phone. Alternatively, the tone can be within the voice band, but at a predetermined frequency that can be easily detected via a tuned notch filter, for example. As in the discussion above, it should be apparent that other alternative signaling schemes are possible. For example, voice input 206-A can alternatively generate first and second tones that have different frequencies to signal respective hook states (e.g. some frequency shift keying scheme), or pulses of the same frequency to signal a change in hook state.

Figure 7:
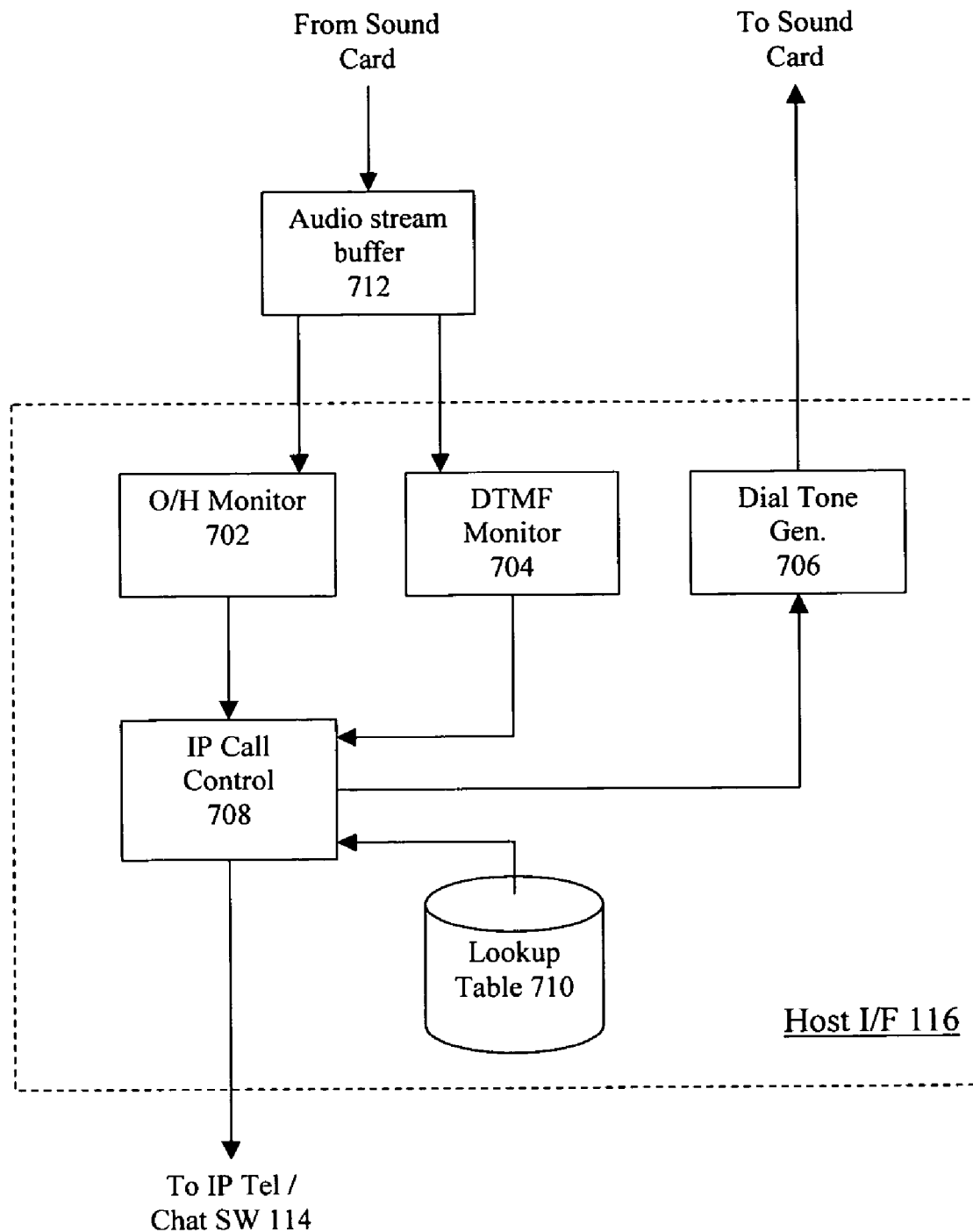
FIG. 7 illustrates the host interface software in accordance with the second example of the invention illustrated in FIG. 5.

FIG. 7 illustrates an example of the host interface software 116.

As shown in FIG. 7, host interface software 116 includes an off-hook monitor 702, a DTMF monitor 704, a dial tone generator 706, an IP call control module 708, and an IP lookup table 710. Host interface software communicates with an audio stream buffer 712, sound card 104 and IP telephony/chat software 114.

Although all the above-listed components will be described in more detail 10 below in connection with this example of the invention, it will become apparent to those of skill that host interface software 116 need not include all the listed components. For example, in one alternative of software 116, only off-hook monitor 702 and IP call control module 708 are provided. These components simply allow the capability of sending a signal to launch a network voice application when the phone is picked up. When the additional components illustrated in FIG. 7 are further provided, additional functionality for requesting IP phone calls and/or voice chat sessions in response to keypad entries from the telephone is possible. These and other variations will become apparent in view of the foregoing descriptions.

Audio stream buffer 712 contains the stream of data representing the sounds generated by either the PC microphone or the telephone mouthpiece, depending on the switch state of first switch 202. As is well understood in the art, the sounds are converted to analog signals by the microphone or mouthpiece and sent to sound card 104, where the analog signals are converted to digital signals and then encoded by such techniques as PCM by sound card 104. The result is a stream of data (e.g. 64 kbps) that refills a buffer in PC 110, which buffer is provided in a storage space (e.g. RAM) addressable by software applications executing in PC 110. The actual techniques used to encode the sound into data, and the schemes used to transfer the data to PC applications are well understood by those of skill in the art, and so the details thereof will not be presented so as not to obscure the invention.

Off-hook monitor 702 monitors the audio stream to determine whether a tone indicating hook state has been generated by telephone interface 102-A. This is done, for example, by filtering the audio data and processing the data to determine if the predetermined tone (i.e. frequency component) is present in the data stream, and for perhaps a threshold amount of time. It should be apparent that there are many alternatives, such as performing a matched filter operation on the data in the audio stream and generating a signal when the correlation between the frequency represented by the matched filter and the frequencies present in the audio stream exceeds a predetermined threshold.

DTMF monitor 704 monitors the audio stream to detect DTMF tones originating from telephone 106. As is well understood in the art, DTMF tones are simply sounds having a combination of two predetermined frequency components, with each number on a keypad generating a unique combination of two frequencies. Accordingly, DTMF monitor 704 determines when the audio stream contains a sound having one of the 12 predetermined combinations of two frequencies. This is implemented by, for example, commercially available DTMF detection software. When such a sound is detected, DTMF monitor 704 further determines the keypad key that was pressed and sends the result to IP call control module 708.

Dial tone generator 706 generates a signal representing a dial tone to be played by sound card 104 through the earpiece of telephone 106 after an off-hook state is detected. This can be done by, for example, repeatedly causing a .WAV file representing a dial tone to be sent to the sound card for playback. Alternatively, dial tone generator 706 can generate different sounds, or voice messages prompting the caller to, for example, enter a number on the keypad.

IP call control module 708 receives messages from off-hook monitor 702 in accordance with hook state signals generated by telephone interface 102-A, messages from DTMF monitor 704 indicating numbers pressed on the keypad of telephone 106, and stored IP phone numbers, scripts and other network voice addresses from IP lookup table 710. IP call control module 708 further communicates with IP telephony/chat software 114 via API calls, for example, to initiate IP phone calls or chat sessions. For communicating with network voice applications that don't have APIs or other software interfaces, IP call control module 708 can include functionality for emulating user inputs for interaction with the user interface of such applications to initiate IP phone calls or chat sessions.

In one example of the invention, IP call control module 708 sends a message to just launch an IP phone call or chat software application when an off-hook state is detected, and then the user is required to enter a desired phone number or called address using the user interface of the application. Alternatively, IP call control module 708 can initiate such calls or sessions in accordance with the information received from off-hook monitor 702, DTMF monitor 704 and IP lookup table 710, so as to automatically launch such applications with the desired phone number or called party. In the latter case, when an off-hook message is received from off-hook monitor 702, and no call is currently in session (determined by an API call to IP telephony/chat software 114 for example), IP call control module 708 first sends messages to dial tone generator 706 to control dial tone generation and to prompt the user to enter the desired phone number and/or application.

IP lookup table 710 stores IP or PSTN phone numbers, scripts and other network voice addresses. In one example of the invention, additional software is provided that allows a user to program IP or PSTN phone numbers and other network voice addresses into the IP lookup table and to associate a phone keypad entry with that phone number or address, as is done with a speed-dialing telephone. Thus, when the short (e.g. two-number sequence) keypad entry is made, the entries are decoded by DTMF monitor 704 and sent to IP call control module 708, which then retrieves the phone number or address programmed for that keypad entry sequence. As an alternative to locally storing phone numbers and other types of addresses, IP lookup table 710 can retrieve such numbers from a directory service, for example.

It should be apparent that there can be many types of numbers and strings stored in IP lookup table 710, depending on the types of network voice applications represented by IP telephony/chat software 114. For example, for and Internet telephony application to a standard phone, the stored number can be a standard phone number. For a voice chat application, the stored number can actually be a macro or script that includes a sequence of operations to simulate the user interactions needed to start the application using the application's user interface.

It should also be noted that PC 110 and/or telephone interface 102-A can include echo cancellation circuitry or functionality to reduce echo introduced as a result of the 4 wire-2 wire conversion. Such circuitry or functionality could be implemented at virtually any stage in the processing of the sound signals from/to the telephone and from/to the network. As is apparent to those of skill in the art, the form of the circuitry or functionality will thus depend on what processing stage echo cancellation is performed. In one example, the echo cancellation is performed by software executing on PC 110 between the audio streams from and to the sound card.

Figure 8:
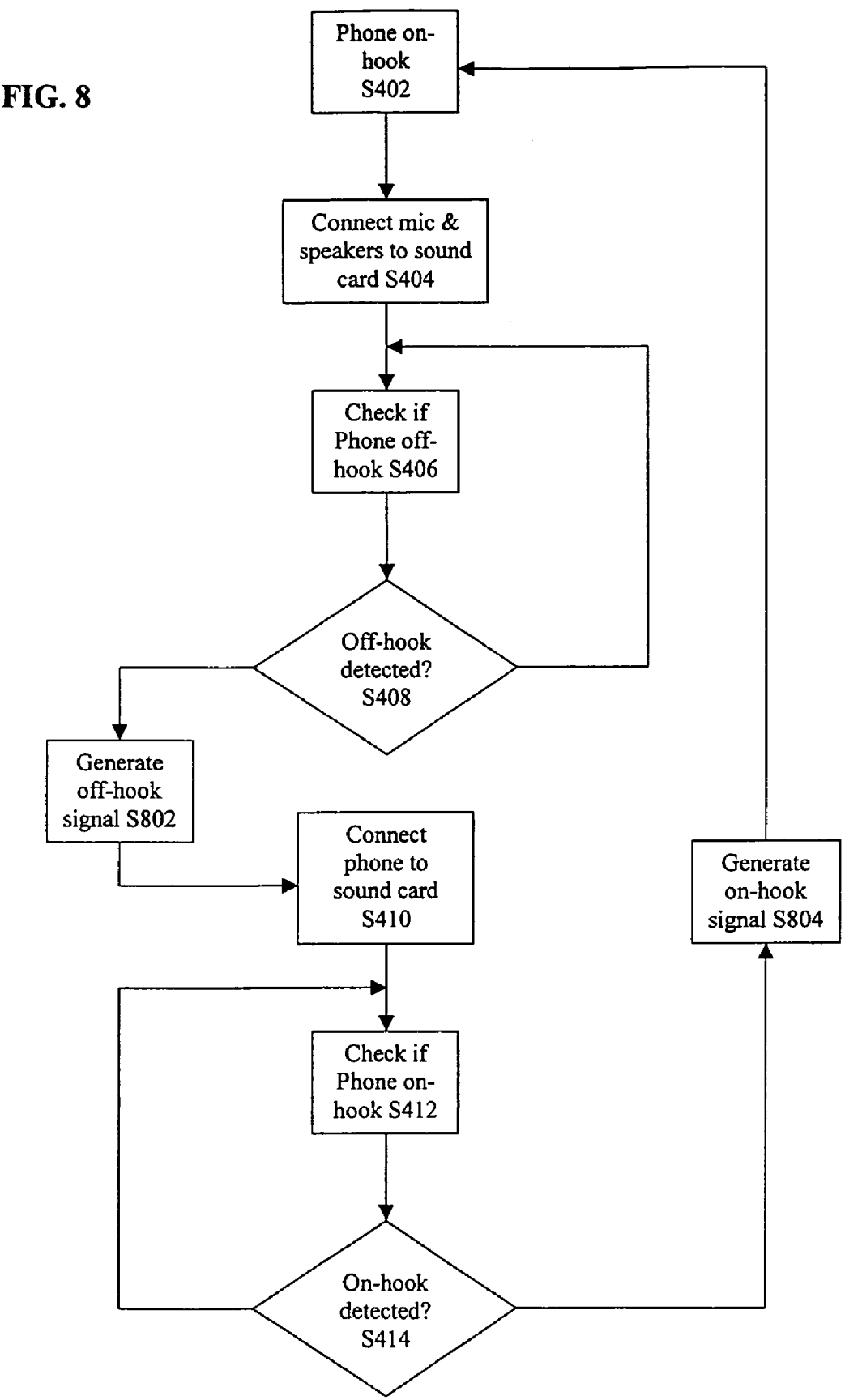
FIG. 8 is a flowchart illustrating a method implemented by the telephone interface in accordance with the second example of the invention.

FIG. 8 is a flowchart illustrating the operation of telephone interface 102-A according to this example of the invention. As shown in FIG. 8, in addition to the steps performed in FIG. 4, operation of telephone interface 102-A further includes step S802 and step S804 for generating an off-hook signal and on-hook signal to sound card 104 when an off-hook or on-hook state is detected, respectively.

Figure 9:
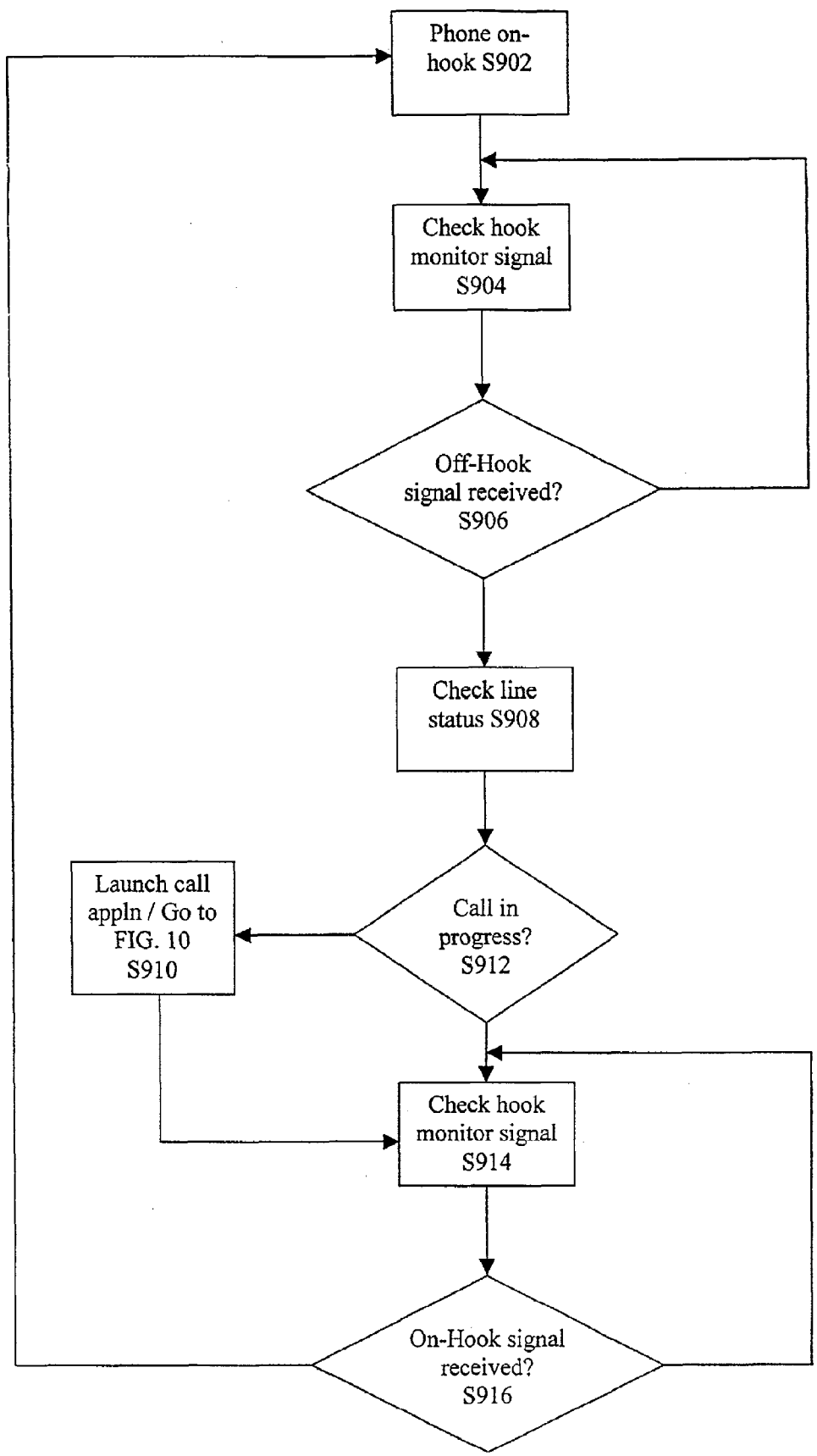
FIG. 9 is a flowchart illustrating a hook state processing method implemented by the host interface software in accordance with the second example of the invention.

FIG. 9 is a flowchart illustrating the hook state processing operation of host interface software 116.

As shown in FIG. 9, in an initial state (step S902), the phone 106 is on-hook. Software 116 continually checks the audio stream from the sound card to determine when an off-hook signal has been generated by the telephone interface (step S904). If a hook signal is detected, e.g. a predetermined tone is detected for a threshold amount of time (determined in step S906), software 116 then checks to see whether a call is currently in session (step S908). This can be done, for example, by making an OS call to a modem driver, or the like, to determine whether a TCP socket has been opened. If no call is in session, software 116 can either simply cause an IP telephony or voice chat application to be launched, or it can further include functionality and perform processing for setting up a desired phone call or chat session in accordance with user inputs as illustrated in more detail in FIG. 10 (step S910). Whether or not a call is in session (as determined in step S912), software 116 next analyzes the audio stream to determine when the phone is placed back on hook (e.g. when a predetermined tone is not detected for a threshold amount of time), which can be at the end of a phone call or chat session, for example (steps S914 and step S916). When that happens, control returns to step S902.

Figure 10:
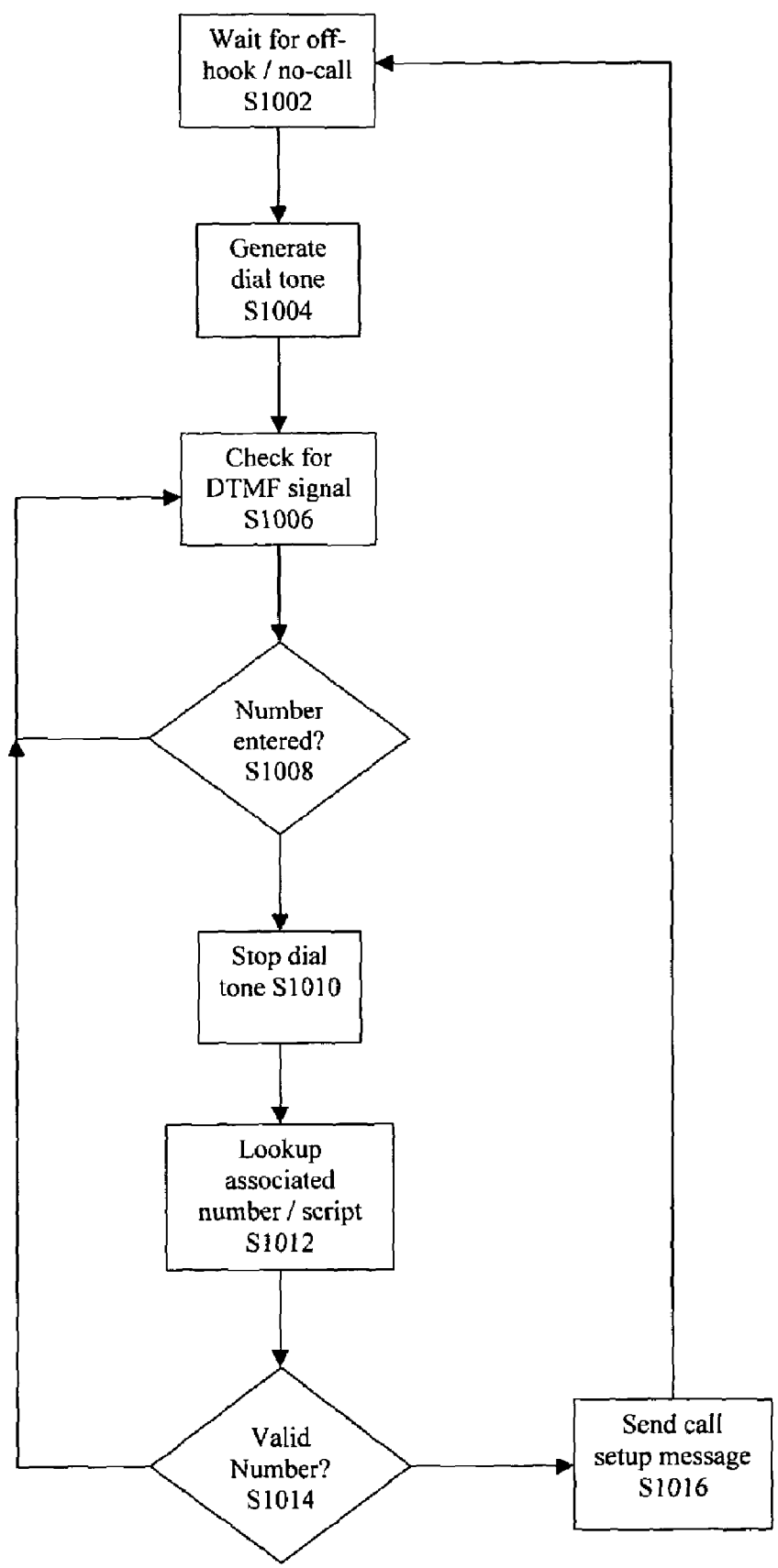
FIG. 10 is a flowchart illustrating a call processing method implemented by the host interface software in accordance with the second example of the invention.

FIG. 10 is a flowchart illustrating the call setup processing operation of host interface software 116 in accordance with an aspect of the invention, which processing can be initiated as part of step S910 in FIG. 9, for example.

As shown in FIG. 10, in this example of the software 116 illustrated in FIG. 7, when an off-hook state is detected, and when there are no other calls in progress (step S1002), software 116 causes a dial tone to be generated and played through the earpiece of the telephone (step S1004). This can be done, for example, by causing a .WAV file or other recording representing a sound or message to be repeatedly played by the sound card. Then software 116 checks for DTMF signals in the audio stream representing keypad entries through the telephone (step S1006). When DTMF signals are detected (determined in step S1008), software 116 stops the dial tone (step S1010). If not, software 116 continues to check for DTMF signals. Software 116 then checks if the numbers represented by the detected DTMF signals have a corresponding entry in the lookup table (it should be apparent that a string or sequence of numbers may need to be accumulated) and attempts to retrieve the corresponding entry from the lookup table (step S1012). If software 116 determines whether there is a corresponding valid entry in the IP lookup table for the entered keypad sequence (determined in step S1014), software 116 causes the desired phone or chat application to be launched and/or the desired phone or chat session to be initiated depending on the retrieved corresponding entry (step S1016). Otherwise, software 116 continues to check for additional or alternative numbers to be entered.

Figure 11:
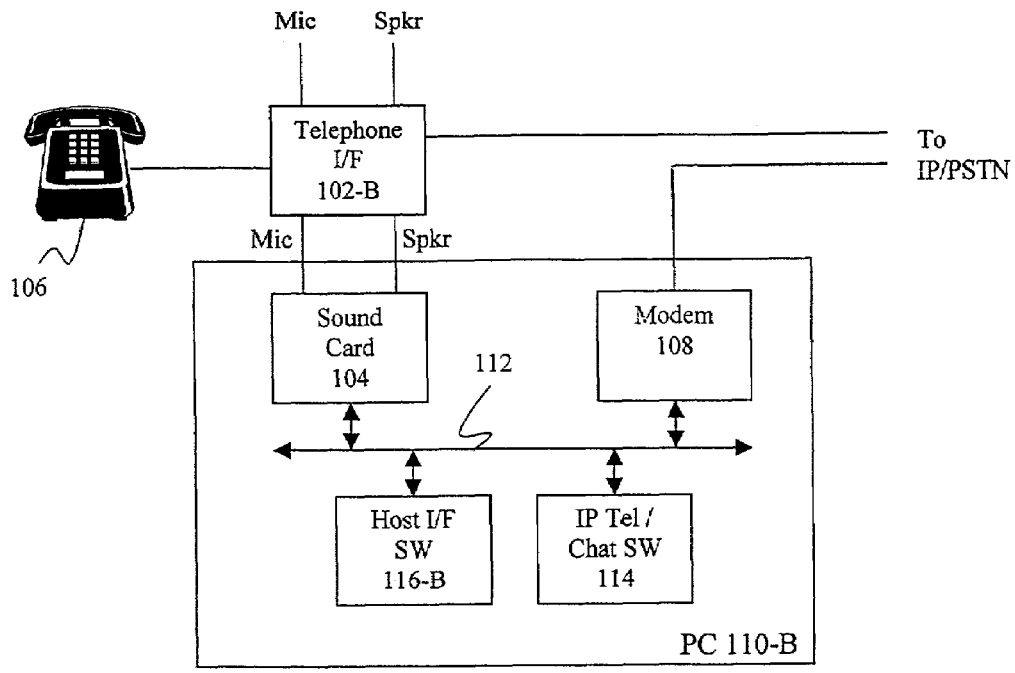
FIG. 11 illustrates a third exemplary implementation of the present invention.

FIG. 11 illustrates a third exemplary implementation of the present invention. As shown in FIG. 11, another example of telephone interface 102-B is provided, which is further coupled to the PSTN in addition to PC 110-B and telephone 106. Moreover, PC 10-B according to this example of the invention includes another example of host interface software 116-B.

It should be apparent that although the connection from telephone interface 102-B is shown as being direct, such as a standard telephone wire to a wall jack for example, it should be understood that many alternatives are possible, for example, through the passthru "phone" jack on a conventional modem such as modem 108.

Figure 12:
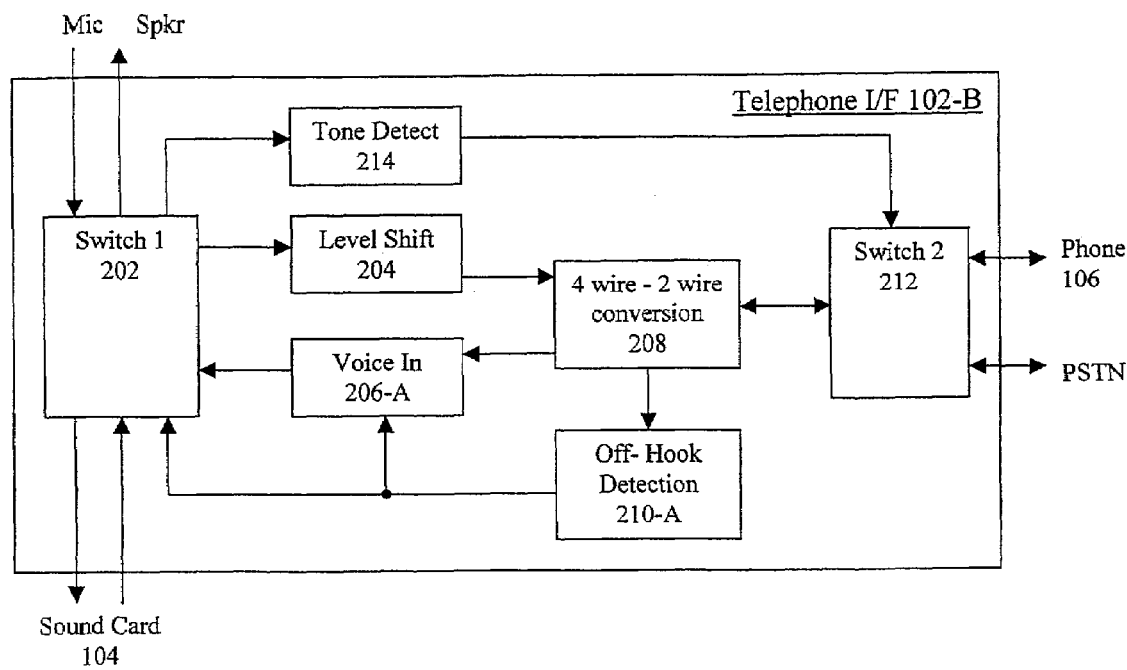
FIG. 12 illustrates a telephone interface in accordance with the third example of the invention illustrated in FIG. 11.

FIG. 12 illustrates a telephone interface 102-B according to this example of the invention in even more detail. As shown in FIG. 12, telephone interface 102-B further includes a second switch 212 and a tone detector 214. In general, second switch 212 and tone detector 214 in conjunction with alternative host interface software 116-B provide additional functionality for permitting telephone 106 to be used both for network voice operations as in the previous examples, and in conventional PSTN phone operations.

Second switch 212 includes relays and circuitry for permitting standard PSTN phone operation when the PC is turned off or when the user desires to place a standard PSTN call as will be described in more detail below. The telephone is connected to the PSTN through second switch 212 and a conventional wall jack. Alternatively, the modem can be connected to the PSTN through modem 108, since most modems allow a telephone to be connected in parallel. In accordance with a control input from tone detector 214 to second switch 212, switch 212 causes the telephone to be switched off the PSTN and to instead receive signals from the level shift circuit. Moreover, in the absence of a control input, switch 212 causes the telephone to be connected to the PSTN when power is not present (e.g. the telephone interface does not have power, the computer is turned off, etc.).

Tone detector 214 includes components to detect the presence of a sound having a predetermined frequency received from sound card 104. As in the case of the tone sent by voice input 206-A to signal hook state, the tone from sound card 104 (generated in response to signals from software 116-B) may be outside the voice band, or may be at a certain frequency within the voice band that can be measured after processing by a notch filter.

Although not necessary for this example of the invention, switch 212 may also include circuitry to detect ring voltage and allow a standard incoming PSTN call to ring the telephone. This further requires, for example, another hook detection circuit or latching circuit to determine when the call is completed and to reset the relay. Moreover, interface 102-B and host interface software 116-B may include functionality for ringing the telephone when an IP telephony call is received via PC 110.

Figure 13:
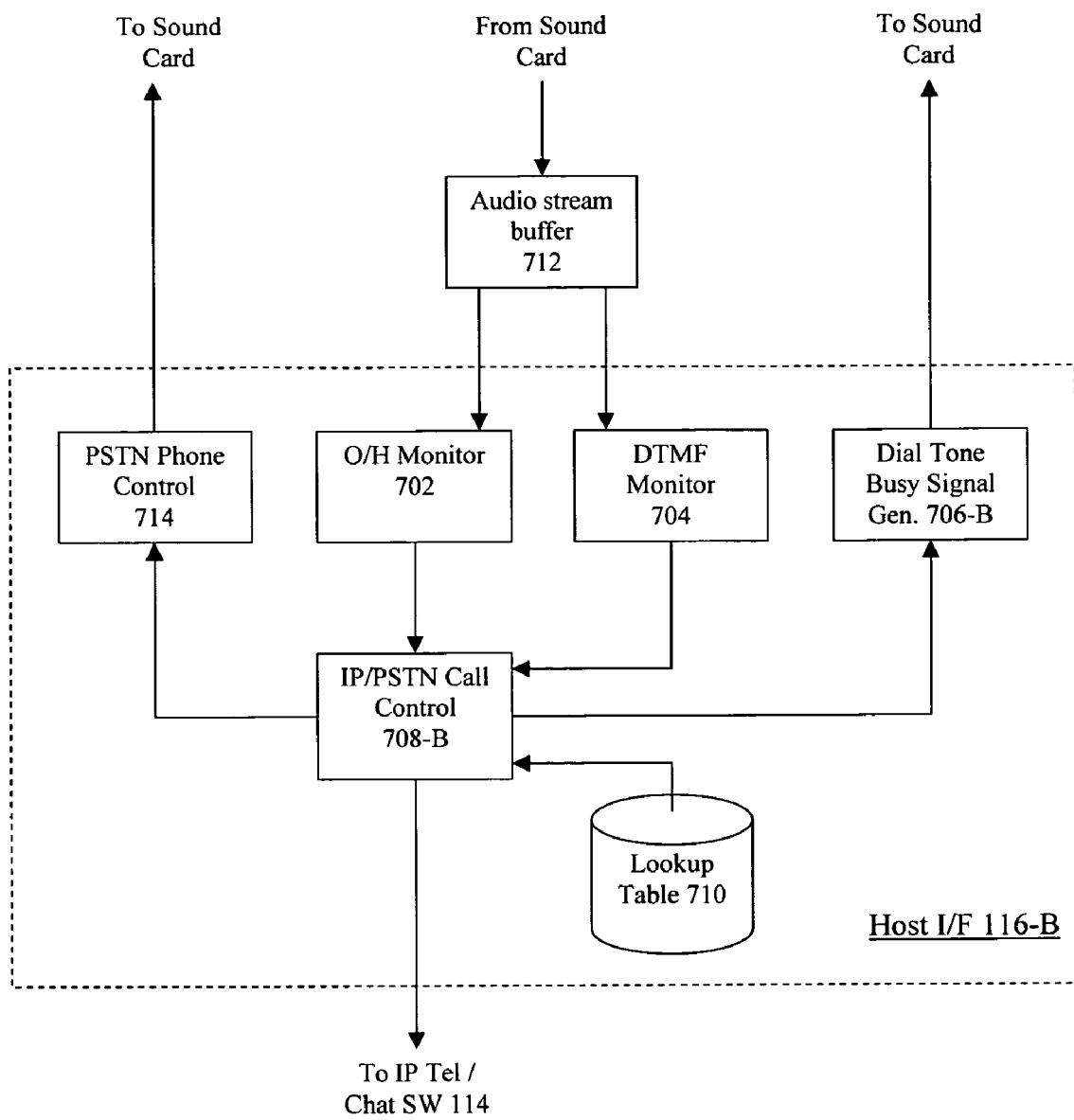
FIG. 13 illustrates the host interface software in accordance with the second example of the invention illustrated in FIG. 11.

FIG. 13 illustrates another example of the host interface software 116-B. As shown in FIG. 13, host interface software 116-B includes an alternative dial tone/busy signal generator 706-B, an alternative IP/PSTN call control block 708-B, and a PSTN phone control block 714.

In addition to the functionality provided by dial tone generator 706, dial tone/busy signal generator 706-B is further capable of generating a signal representing a busy signal to be played through the earpiece of telephone 106 when a call is requested to be placed via telephone 106 while an IP call or voice chat is already in session, or the IP channel is otherwise unavailable (e.g. a suitable amount of bandwidth cannot be reserved).

In addition to the functionality provided by IP call control module 708, IP/PSTN call control module 708-B further sends messages to dial tone/busy signal generator 706 to control the start and stop of busy signal generation. IP/PSTN call control module 708-B also includes functionality for sending messages to PSTN phone control block 714 for controlling the connection of phone 106 to the PSTN via second switch 212. This can be done, for example, in response to a keypad entry sensed through DTMF monitor 704 (e.g. the user dials a "9" to place a PSTN call).

PSTN phone control block 714 generates a signal to telephone interface 102-B for controlling the connection of phone 106 to the PSTN via second switch 212. In one example of the invention, the signal causes a predetermined tone to be played by the sound card which can be detected by tone detector 214 in telephone interface 102-B.

Figure 14:
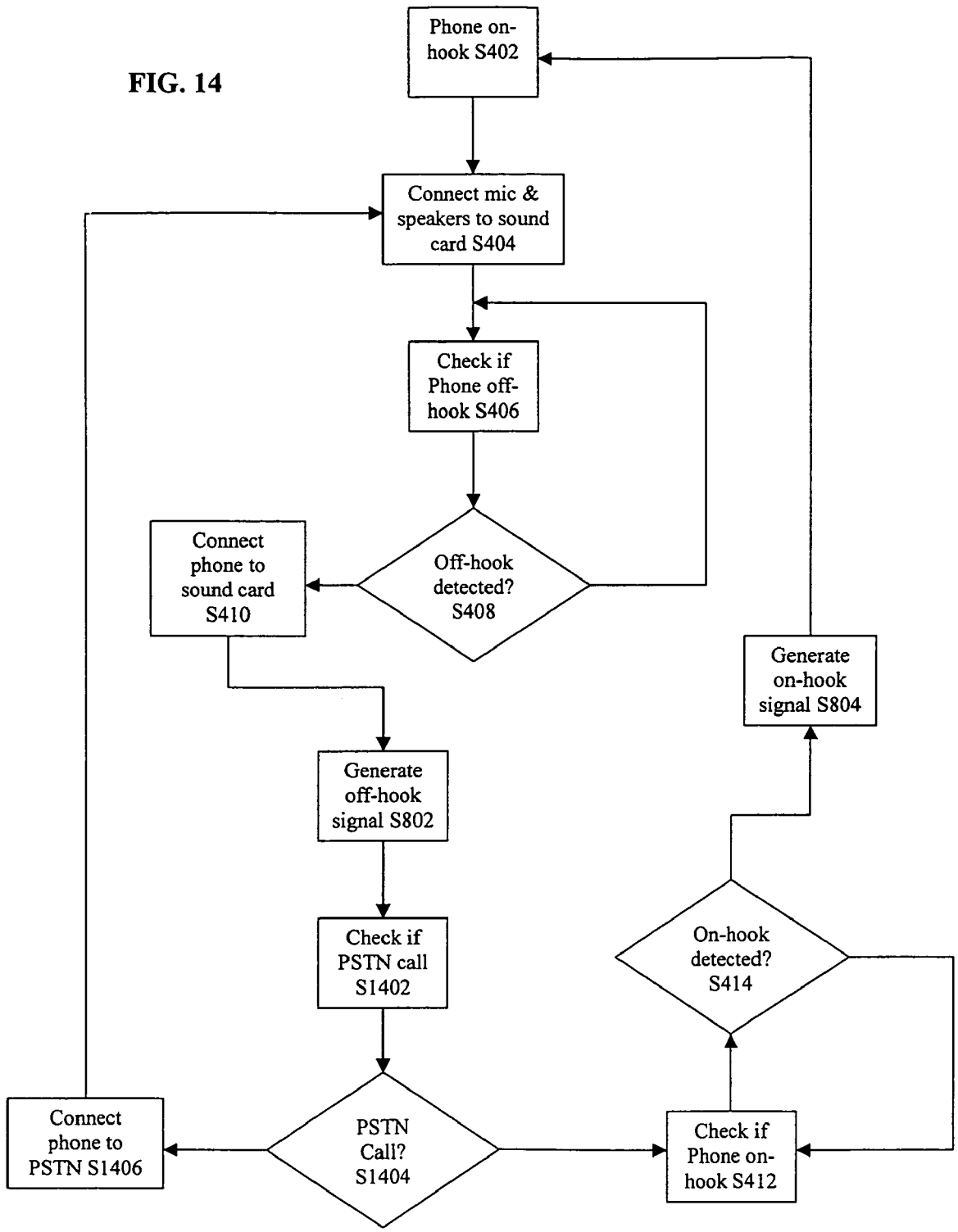
FIG. 14 is a flowchart illustrating a method implemented by the telephone interface in accordance with the third example of the invention.

FIG. 14 is a flowchart illustrating the operation of telephone interface 102-B according to this example of the invention. As shown in FIG. 14, in addition to the steps performed in FIG. 8, operation of telephone interface 102-B further includes steps S1402 to S1406 for determining whether a PSTN phone call has been selected. In one example of the invention, this is done by sensing keypad entries from telephone 106. For example, software 116 may be configured to send a predetermined tone to telephone interface 102-B when a user first enters a certain key (e.g. a "9" or a "*"). Accordingly, as shown in FIG. 14, when first switch 202 is configured to direct the sound card outputs to the telephone, tone detector 214 monitors the sound card output and determines whether the output includes the predetermined tone that signals that a PSTN call has been selected (step S1402). If the tone is being generated (determined in step S1404), tone detector 214 sends a signal to second switch 212 causing the phone to be connected to the PSTN (step S1406). Control is then returned to step S1404 where the standard microphone and speakers are connected back to the sound card, and telephone interface 102-B waits for the phone to be lifted off-hook again. If a PSTN call has not been selected (determined in step S1404), processing returns to that similar to FIG. 8, where telephone interface 102-B waits for the phone to be placed back on-hook.

Figure 15:
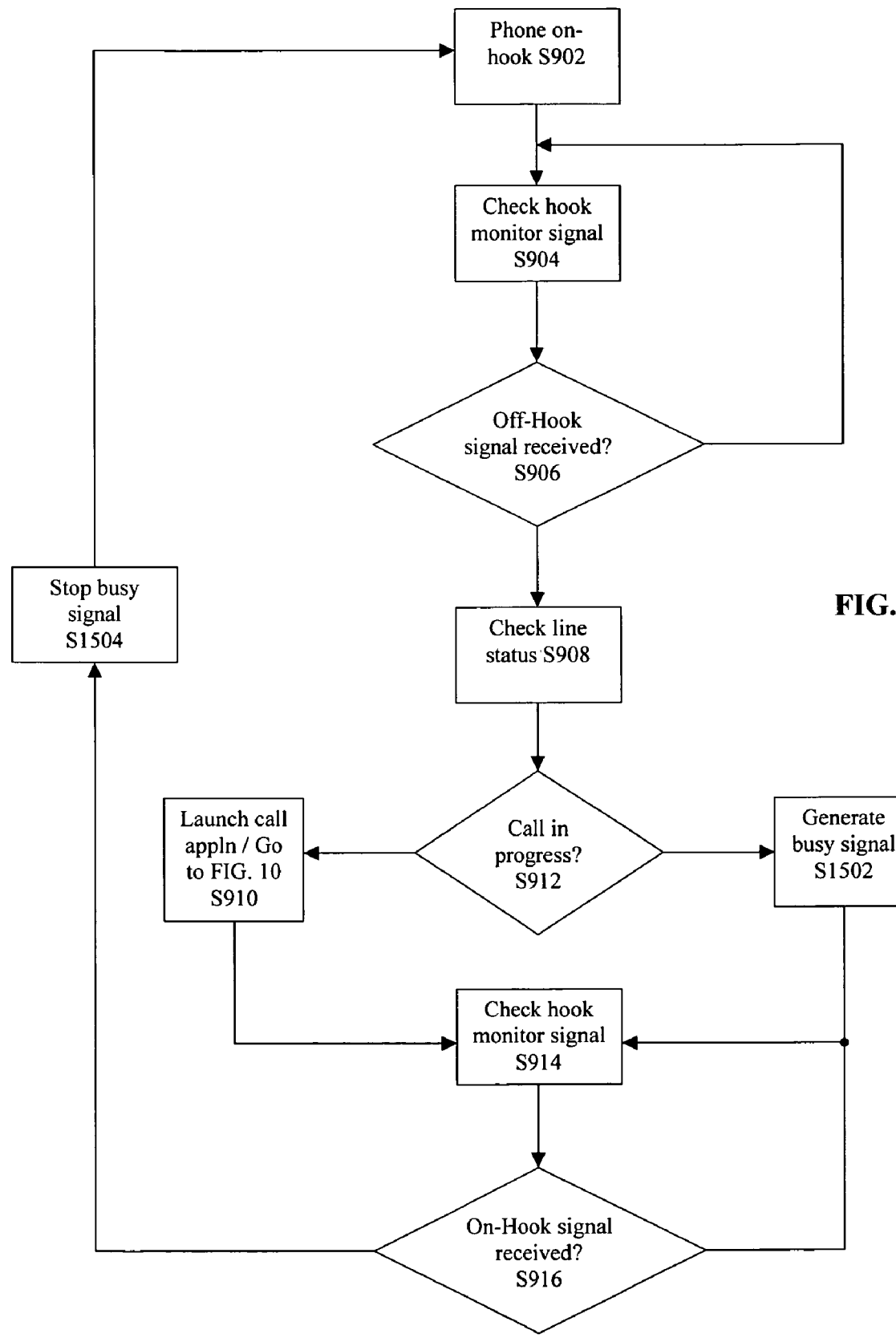
FIG. 15 is a flowchart illustrating a hook state processing method implemented by the host interface software in accordance with the third example of the invention.

FIG. 15 is a flowchart illustrating the hook state processing operation of host interface software 116-B according to this example of the invention. As shown in FIG. 15, in addition to the steps performed in FIG. 9, operation of host interface software 116 further includes step S1502 for generating a busy signal when a call is currently in progress or access is otherwise prevented and the phone is picked up, and step S1504 for stopping the busy signal (if one is generated) when the phone is hung up.

Figure 16:
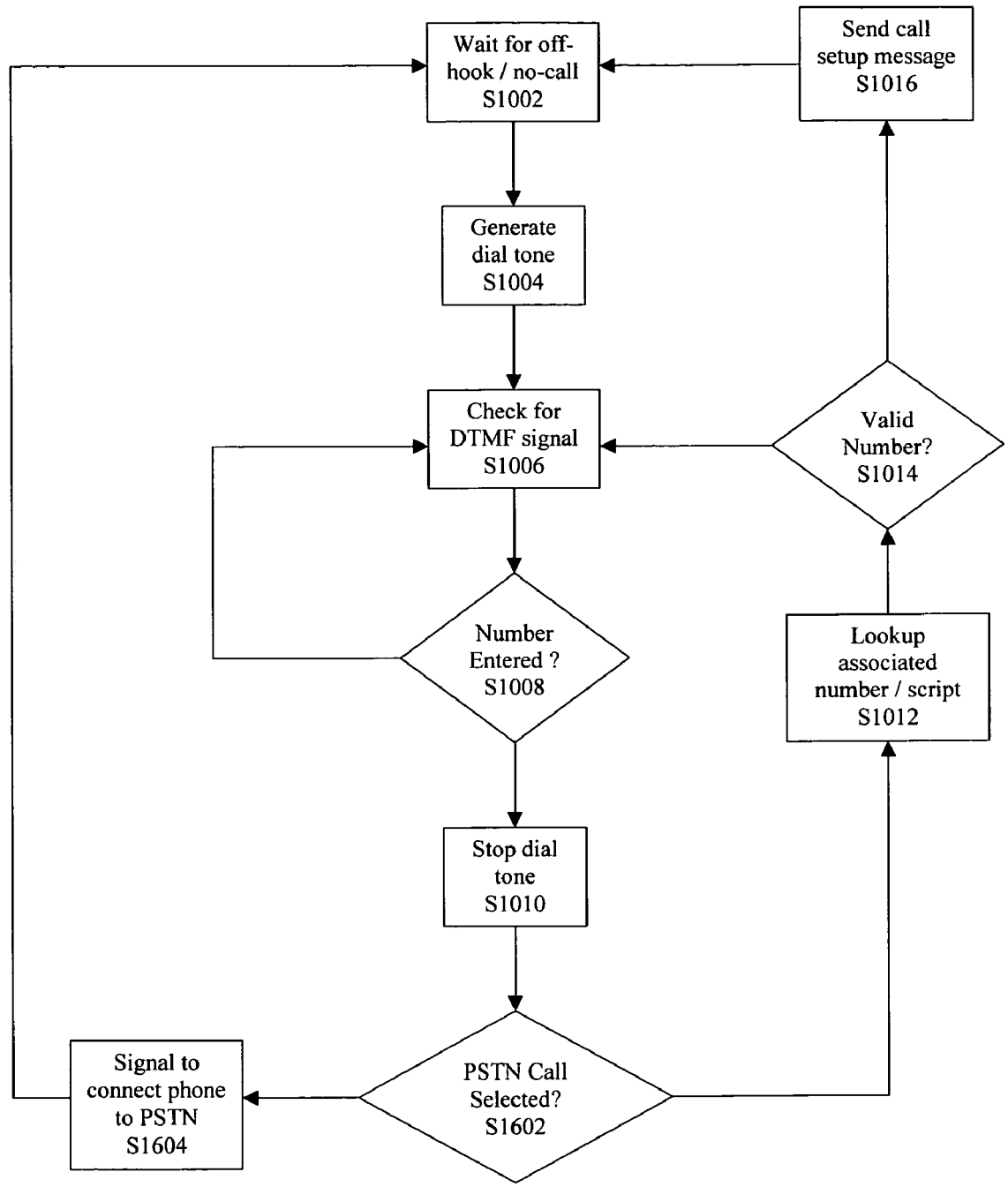
FIG. 16 is a flowchart illustrating a call processing method implemented by the host interface software in accordance with the third example of the invention.

FIG. 16 is a flowchart illustrating the call setup processing operation of host interface software 116-B according to this example of the invention. As shown in FIG. 16, in addition to the steps performed in FIG. 10, operation of host interface software 116 further includes steps S1602 and S1604 for causing the phone to be connected to the PSTN when a PSTN phone call has been selected.

As discussed in more detail above, in this example of the invention, a user can select to use the telephone for a PSTN call instead of an IP call or chat session by entering a predetermined keypad sequence on the telephone (e.g. by dialing a "9" or a "*"). All keypad sequences are detected by software 116 (steps S1004 and S1006). After the dial tone is discontinued (step S1010), software 116 determines whether the keypad sequence is one for selecting a PSTN call (step S1602). If so, software 116 causes a signal to be sent to telephone interface 102-B which causes the phone to be switched over to the PSTN. Otherwise, processing as described in connection with FIG. 10 is performed for launching a IP phone call or voice chat session.

Although the present invention has been described in detail with reference to the preferred embodiments thereof, those skilled in the art will appreciate that various substitutions and modifications can be made to the examples described herein. In particular, the various embodiments of the invention are not intended to be mutually exclusive. That is, certain components and functionalities of some embodiments can be interchanged with certain components and functionalities of other embodiments, after those of skill in the art have been taught by the present specification. Such substitutions, modifications and interchangeability between embodiments can be made while remaining within the spirit and scope of the invention as defined in the appended claims.

What is claimed is:

1. An interface for using a telephone with a computer, comprising:

a first switch that selectively couples the telephone to the computer, the first switch being operable in accordance with a control signal;

a hook detector that is coupled to the telephone and the first switch and generates the control signal in accordance with a hook state of the telephone;

a level shifter that is coupled between the first switch and the telephone and converts first sound signals originating from the computer into second sound signals for generating sound by the telephone when the first switch couples the telephone to the computer;

a voice input that is coupled between the first switch and the telephone and converts third sound signals originating from the telephone into fourth sound signals for reception by the computer when the first switch couples the telephone to the computer; and host interface software in the computer, the host interface software receiving data corresponding to the fourth sound signals and being adapted to cause network voice applications to be launched in accordance with predetermined patterns in the fourth sound signals.

2. An interface according to claim 1, further comprising:
a tone generator that generates a first tone in accordance with the hook state of the telephone for reception by the computer,
wherein the host interface software includes a dial tone generator that causes a dial tone at the telephone via the first sound signals in response to the first tone.

3. An interface according to claim 1, further comprising:
a second switch that selectively couples the telephone to a telephone network in accordance with a second control signal.

4. An interface according to claim 3, further comprising:
a tone detector coupled to the second switch that generates the second control signal in accordance with a second tone received from the computer.

5. An interface according to claim 1, further comprising a directory accessible by the host interface software that associates the predetermined patterns with parameters needed to launch the network voice applications and control an audio session.

6. An interface according to claim 1, wherein the host interface software includes functionality for emulating user inputs for interaction with a user interface associated with the network voice applications where an API is not employed.

7. An interface according to claim 1, further comprising an audio stream buffer that stores a stream of data corresponding to the fourth sound signals and is addressable by a plurality of applications of the computer.

8. An interface for using a telephone with a computer, comprising:
first means for selectively coupling the telephone to the computer in accordance with a control signal;
means for generating the control signal in accordance with a hook state of the telephone;
means for converting first sound signals originating from the computer into second sound signals for generating sound by the telephone when the first means couples the telephone to the computer;
means for converting third sound signals originating from the telephone into fourth sound signals for reception by the computer when the first means couples the telephone to the computer; and
means for receiving data corresponding to the fourth sound signals and for causing network voice applications to be launched in accordance with predetermined patterns in the fourth sound signals.

9. An interface according to claim 8, further comprising:
means for generating a first tone in accordance with the hook state of the telephone; and
means for causing a dial tone at the telephone via the first sound signals in response to the first tone.

10. An interface according to claim 8, further comprising:
second means for selectively coupling the telephone to a telephone network in accordance with a second control signal.

11. An interface according to claim 8, further comprising:
means for generating the second control signal in accordance with a second tone received from the computer.

12. An interface according to claim 8, further comprising means for associating the predetermined patterns with parameters needed to launch the network voice applications and means for controlling an audio session.

13. An interface according to claim 8, further comprising means for emulating user inputs for interaction with a user interface associated with the network voice applications where an API is not employed.

14. An interface according to claim 8, further comprising means for storing a stream of data corresponding to the fourth sound signals and means for allowing the stored data to be addressable by a plurality of applications of the computer.

15. A method for using a telephone with a computer, comprising:
generating a control signal in accordance with a hook state of the telephone;
selectively coupling the telephone to a computer in accordance with the control signal using a first switch;
converting first sound signals originating from the computer into second sound signals for generating sound by the telephone when the first switch couples the telephone to the computer;
converting third sound signals originating from the telephone into fourth sound signals for reception by the computer when the first switch couples the telephone to the computer;
receiving data corresponding to the fourth sound signals at the computer; and
causing network voice applications to be launched in accordance with predetermined patterns in the fourth sound signals.

16. A method according to claim 15, further comprising:
generating a first tone in accordance with the hook state of the telephone; and
causing a dial tone at the telephone via the first sound signals in response to the first tone.

17. A method according to claim 15, further comprising:
selectively coupling the telephone to a telephone network in accordance with a second control signal.

18. A method according to claim 17, further comprising:
generating the second control signal in accordance with a second tone received from the computer.

19. A method according to claim 15, further comprising associating the predetermined patterns with parameters needed to launch the network voice applications.

20. A method according to claim 15, further comprising emulating user inputs for interaction with a user interface associated with the network voice applications and controlling an audio session.

21. A method according to claim 15, further comprising storing a stream of data corresponding to the fourth sound signals and allowing the stored data to be addressable by a plurality of applications of the computer.

22. An apparatus for use in network voice operations, the apparatus comprising:
a computer including a modem for communicating with a computer network;
a telephone that is configured for use in standard telephone operations;
a telephone interface that selectively couples the telephone to the computer in accordance with a hook state of the telephone, the telephone communicating audio signals with the computer during network voice operations using a pre-existing audio channel of the computer; and
host interface software in the computer, the host interface software receiving data corresponding to the audio signals and being adapted to cause network voice applications to be launched in accordance with predetermined patterns in the audio signals.

* * * * *